United States Patent [19]
Caldwell

[11] Patent Number: 5,901,491
[45] Date of Patent: May 11, 1999

[54] OWL WITH MOVABLE HEAD

[75] Inventor: E. Neal Caldwell, Knoxville, Tenn.

[73] Assignee: Dalen Products, Inc., Knoxville, Tenn.

[21] Appl. No.: 08/903,929

[22] Filed: Jul. 31, 1997

[51] Int. Cl.$^6$ .......................... A01M 31/06; A01M 1/10; A01M 13/00
[52] U.S. Cl. .................. 43/1; 43/2; 43/124; 43/58
[58] Field of Search .................. 43/2, 1, 124, 58; 40/411, 415, 416, 417, 421; D11/162; D21/606; 446/175, 72, 268, 330, 326, 381, 384, 391, 396

[56] References Cited

U.S. PATENT DOCUMENTS

| | | |
|---|---|---|
| 278,461 | 5/1883 | Screven . |
| 954,288 | 4/1910 | Holloway . |
| 1,066,045 | 7/1913 | Pass . |
| 1,167,502 | 1/1916 | Huffman et al. . |
| 1,286,380 | 12/1918 | Matthews . |
| 1,287,968 | 12/1918 | Greenleaf . |
| 2,545,801 | 3/1951 | Wrazen ................................ 46/53 |
| 2,575,252 | 11/1951 | Berger ............................... 40/417 |
| 2,722,195 | 11/1955 | Rockafeller ....................... 116/22 |
| 3,085,545 | 4/1963 | Ore ..................................... 116/22 |
| 3,290,817 | 12/1966 | Kravath ............................. 46/32 |
| 3,487,569 | 1/1970 | Mendall ............................. 40/37 |
| 3,735,514 | 5/1973 | Asder ................................. 40/39 |
| 3,818,630 | 6/1974 | May .................................. 443/396 |
| 4,038,639 | 7/1977 | Kuebler ............................. 340/272 |
| 4,131,079 | 12/1978 | Rousseau, Jr. et al. .......... 116/22 |
| 4,239,825 | 12/1980 | Kaulfuss et al. ................. 428/16 |
| 4,597,357 | 7/1986 | LeMessurier ..................... 116/22 |
| 5,112,265 | 5/1992 | Naum ................................ 446/384 |
| 5,274,942 | 1/1994 | Lanius .............................. 43/2 |
| 5,289,654 | 3/1994 | Denny et al. ..................... 43/2 |

Primary Examiner—Michael J. Carone
Assistant Examiner—Fredrick T. French, III
Attorney, Agent, or Firm—Luedeka, Neely & Graham PC

[57] ABSTRACT

A replica of an owl for use in a garden for deterring pests, the replica having a first body portion corresponding generally in shape to the body of a live owl and a second body portion corresponding generally in shape to the head of a live owl, the second body portion being rotatably mounted adjacent an upper portion of the first body portion for rotational movement relative to the first body portion.

22 Claims, 5 Drawing Sheets

OWL WITH MOVABLE HEAD

FIELD OF THE INVENTION

This invention relates generally to devices for protecting crops. More particularly, this invention relates to devices for use in a garden which replicate the shape of predators and move in response to wind to frighten birds, rabbits and other garden pests.

BACKGROUND AND SUMMARY OF THE INVENTION

Owls are birds of prey which feed on animal life, from insects to rabbits and birds. The head of an owl is typically round and flat-faced, with large eyes. The eyes face forward and are fixed in their sockets and an owl must turn its head to follow a moving object. In fact, owls can swivel their heads about 180 degrees.

Placement of a replica of an owl in a garden is believed to reduce the incidence of pest destruction in the garden. Examples of such replicas include vinyl, "blow-up" owl-shaped bodies and rigid plastic owl-shaped bodies. Frequent repositioning of the owl replica enhances the deterrent effect of such replicas as the owl appears to move about the garden and is thus more realistic as compared to one which stays in the same place for several days. However, such replicas are otherwise motionless and have no movement which resembles the natural head turning movement of a live owl.

Accordingly it is an object of the present invention to provide an improved device for deterring pests.

An additional object of the invention is to provide a pest deterrent device of the character described which is more realistic in appearance as compared to conventional devices.

Another object of the present invention is to provide a device of the character described which moves.

A still further object of the invention is to provide a device of the character described which moves in response to wind.

Yet another object of the invention is to provide a device of the character described which imitates the head movement of a live owl.

A still further object of the invention is to provide an owl replica of the character described which enables three-dimensional movement of the head of the owl replica.

Still another object of the present invention is to provide a device of the character described which is uncomplicated in configuration and economical.

Having regard to the foregoing and other objects, the present invention is directed to a replica of an owl for use in a garden for deterring pests.

According to the invention, the replica includes a first body portion corresponding generally in shape to the body of a live owl and a second body portion corresponding generally in shape to the head of a live owl. The second body portion is rotatably mounted adjacent an upper portion of the first body portion for rotational movement relative to the first body portion.

A significant aspect of the invention relates to the provision of an owl replica having a head portion which is capable of random rotational and other movement such that the replica exhibits head movements corresponding to the head movements of a live owl. For example, in a preferred embodiment, the head of the owl replica is mounted on the end of a needle which engages a conical surface. This provides a low friction mounting interface which enables the head to nod, rock and/or rotate in response to even slight air movement.

BRIEF DESCRIPTION OF THE DRAWINGS

The above and other features and advantages of the present invention will become further known from the following detailed description when considered in conjunction with the accompanying drawings in which:

FIG. 3a is a closeup view of structure for enabling movement of the head in accordance with the invention and FIG. 3b is an exploded view of the structure of FIG. 3a.

FIG. 4 is an enlarged view of a portion of FIG. 3a.

FIG. 5a is a bottom plan view of a component of a lower portion of the pivot structure of FIG. 3a. FIG. 5b is a cross-sectional view of a portion of the component of FIG. 5a and FIG. 5c is a top plan view of the component of FIG. 5a.

FIG. 6a is a bottom plan view of a component of an upper portion of the pivot structure of FIG. 3a. FIG. 6b is a cross-sectional view of a portion of the component of FIG. 6a and FIG. 6c is a top plan view of the component of FIG. 6a.

DETAILED DESCRIPTION

Figure 1A:
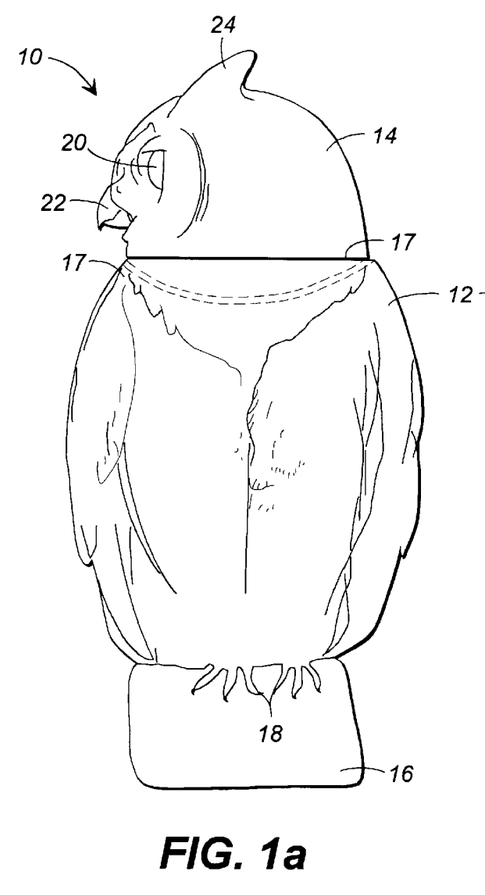
FIGS. 1a and 1b are frontal views of an owl replica in accordance with the invention showing the head of the owl rotated to different orientations relative to the body.

With initial reference to FIG. 1a, there is shown a frontal view of an owl replica 10 provided in accordance with the present invention. The owl 10 includes a body 12 and a head 14 located above the body 12. In a preferred embodiment, the body 12 is configured to resemble the body of a real owl perched upon a tree stump 16. As explained in more detail below, the head 14 of the owl replica 10 is movable relative to the body 12 in a manner which enables free movement in three dimensions for realistic imitation of the head movement of a live owl to enhance the effectiveness of the replica 10 in deterring pests from a garden environment.

Figure 1B:
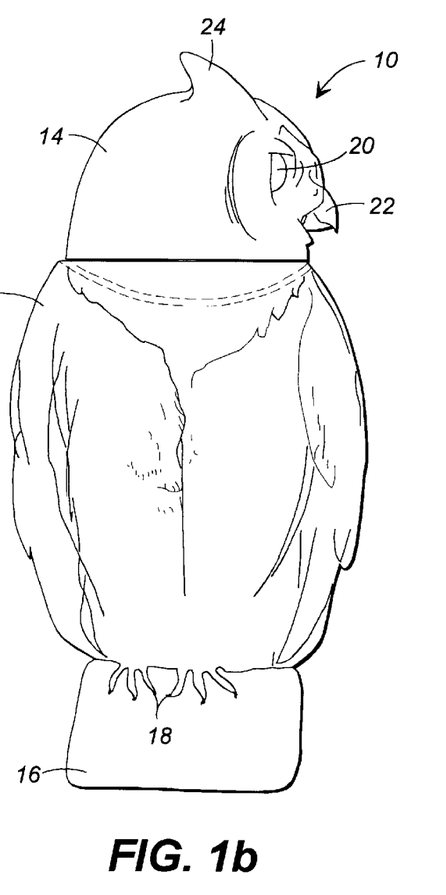

FIG. 1b shows the head 14 rotated 180° from its orientation in FIG. 1a in imitation of the head rotation of a live owl when turning its head to view prey. In addition to rotation, the head 14 is also capable of further movements, such as a front to back nodding motion and/or a side-to-side rocking motion, corresponding to owl head movements.

To enhance the resemblance of the owl replica 10 to that of a real owl, such as a great horned owl, the replica 10 preferably includes coloring and body and feather contours 17 resembling that of a real owl and other features, such as feet 18, eyes 20, beak 22 and ear tufts 24. The body 12 and head 14 are preferably constructed of a plastic material such as polyethylene as by blow molding and thereafter painted to resemble a real owl. The body dimensions also preferably correspond to that of a real owl. Thus, for example, a replica of a great-horned owl as shown in the drawings preferably has an overall length of from about 16 to about 22 inches, with a head portion having a height of from about 3 to about 5 inches and a body portion having a length of from about 13 to about 17 inches.

Figure 2:
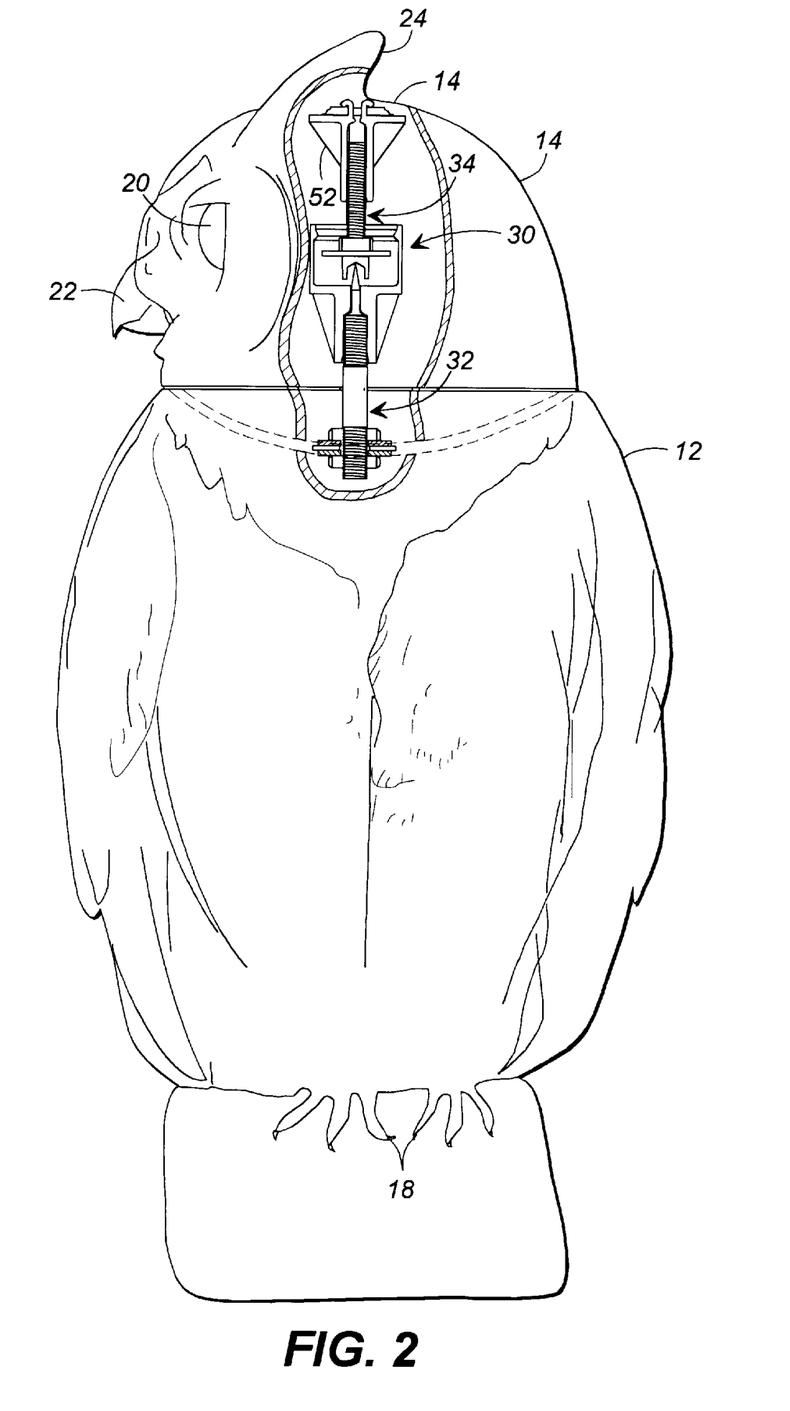
FIG. 2 is an enlarged view of the owl of FIG. 1a with portions of the head and body of the owl cutaway to reveal structure for enabling movement of the head relative to the body in accordance with the invention.

With reference to FIG. 2, the owl replica 10 preferably includes a head mounting system 30 for movably mounting the head 14 to the body 12 of the owl replica 10. With additional reference to FIGS. 3a and 3b, the mounting system 30 may include a lower assembly 32 rigidly mounted to the body 12 and an upper assembly 34 rigidly secured to the head 14 and pivotally mounted above the lower assembly 32.

Figures 3A, 3B, 4:
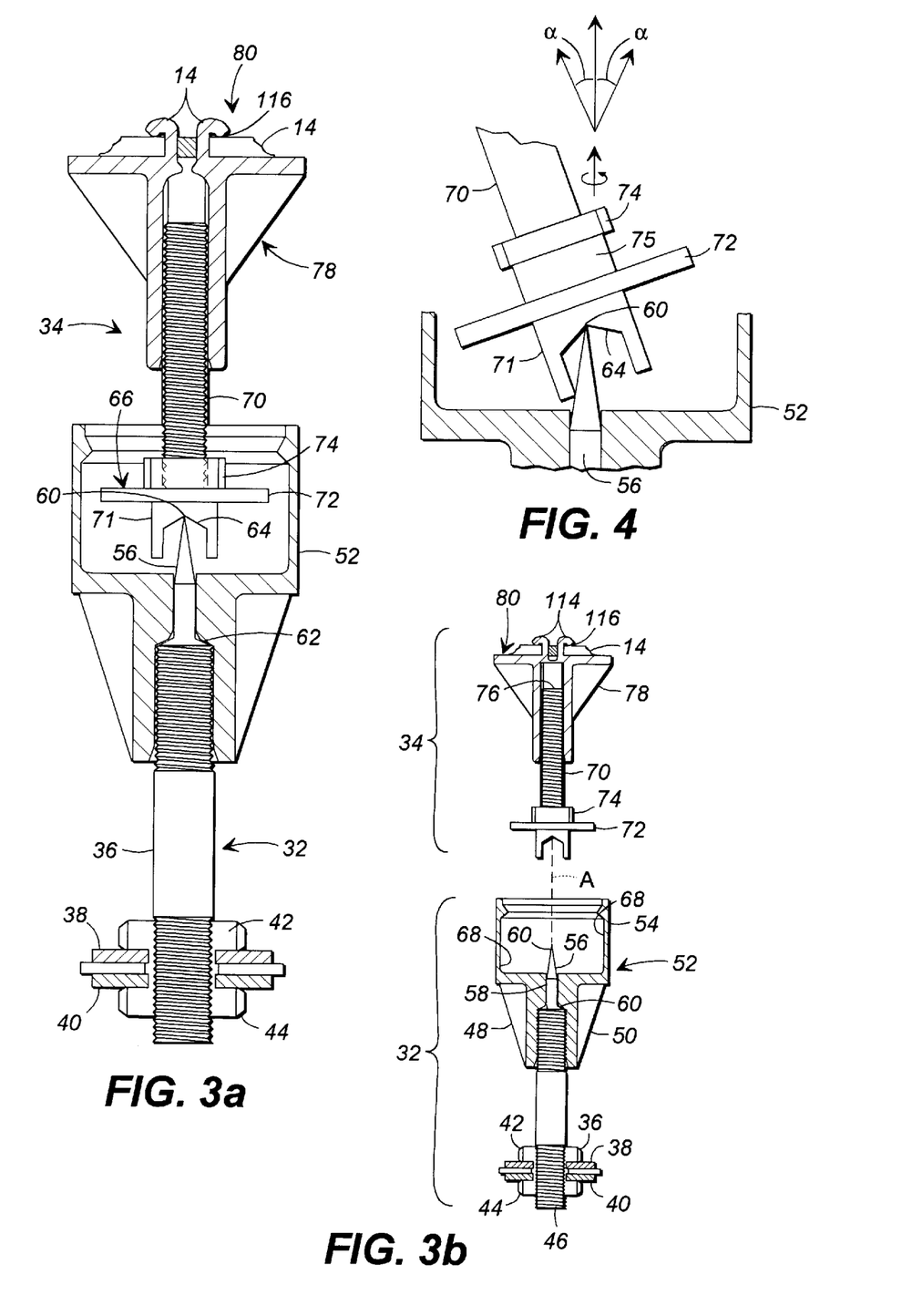

In a preferred embodiment, the lower assembly 32 includes a threaded bolt 36 having a pair of washers 38 and 40 and a pair of nuts 42 and 44 receivable upon a lower end 46 of the bolt 36. Upper end 48 of the bolt 36 is threadably received within a lower portion 50 of a needle housing 52 also having an upper cup-shaped portion 54. A needle 56 extends through an aperture 58 provided along central vertical axis a of the housing 52 between the lower portion 50 and the upper cup-shaped portion 54 of the housing such that an upper pointed end 60 of the needle penetrates into the openness of the cup-shaped portion 54 and a lower, flattened end 62 of the needle 56 rests against the upper end 48 of the bolt 36. The needle preferably is made of hardened steel and has an included point angle of from at least about 14 degrees, preferably about 28 degrees, with a hardness of at least about Rockwell "C" 50, preferably from about Rockwell "C" 60 to about 70.

A preferred upper assembly 34 suitable for use with the lower assembly 32 includes conical pivot surface 64 positionable in contact with the upper end 60 of the needle 56 and a pivot stop 66 configured to be received within the cup-shaped portion 54 of the needle assembly and sized to avoid contact with sidewalls 68 of the cup-shaped portion 54 when a desired pivot angle (FIG. 4) of the upper assembly 34 is less than about 20° such that movement of the head is not dampened. As will be appreciated, the mounting system 30 is configured to enable the upper assembly to rotate and/or gyroscopically pivot so that the head 14 may rotate 360° relative to the body and/or rock from side to side and/or nod from front to back.

In a preferred embodiment, the pivot surface 64 may be provided by the conical bottom of the hex of a so-called Allen Head cap screw, such as hardened steel cap screw 70 having head 71 and the pivot stop 66 provided as by a washer 72 secured against the head of the cap screw 70 as by nut 74 and, if desired, spacer bushing 75 (FIG. 4). An upper end 76 of the screw 70 may be threadably received within an adjusting head 78 having an upper portion 80 which is secured to the head 14 of the owl.

Figure 5A:
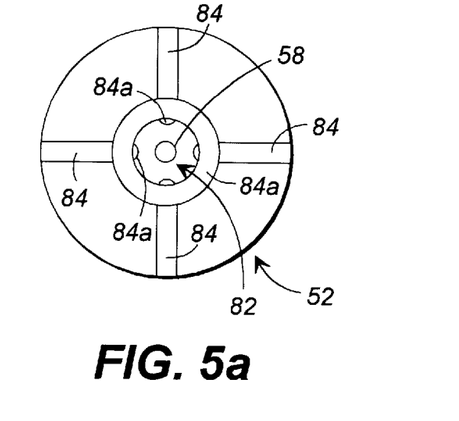
Figure 5B:
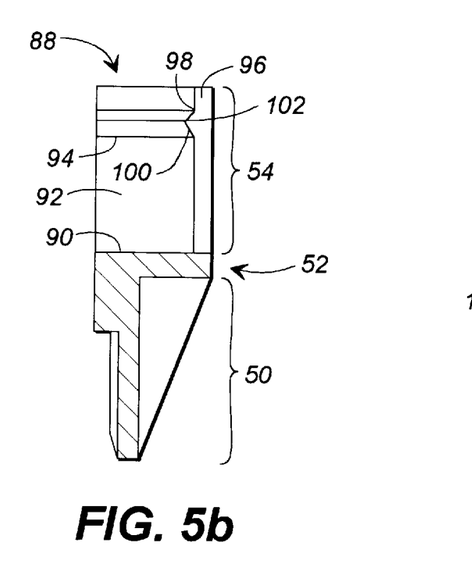
Figure 5C:
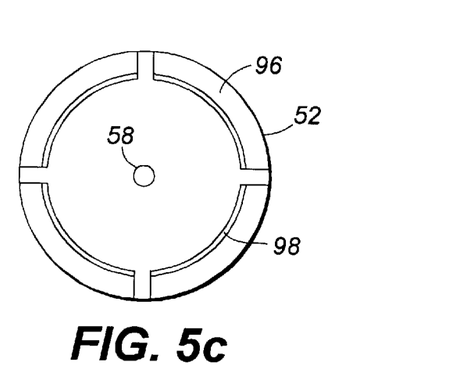

With reference to FIGS. 5a–5c, the needle housing 52 is preferably provided by a one-piece plastic split-cup housing. In a preferred embodiment, the lower portion 50 of the housing 52 includes a blind bore 82 below the aperture 58 which is strengthened by gussets 84 which surround the bore 82 and partially extend into the bore 82, as represented by gusset portions 84a. The gusset portions 84a being plastic, deform in response to rotational introduction of the bolt 36 to threadably receive the bolt. The aperture 58 is preferably sized as by drilling slightly undersized to frictionally engage the needle 60 so that it is snugly retained by the aperture 58.

The upper portion 54 of the housing includes a blind bore 88 having a circular bottom 90 above the lower portion 50, with the aperture 58 extending through the bottom 90 so that the point 60 of the needle extends into the bore 88 when the needle is inserted into the aperture. The bottom 90 has a diameter slightly greater than that of the washer 72 and is surrounded by a circular, continuous lower sidewall 92 of like diameter which extends upwardly from the bottom 90 to line 94 and an upper split sidewall 96 of variable diameter above the line 94. As shown in FIG. 4, the inner diameter of the sidewall 92 is slightly greater than that of the washer and is sufficient to enable the washer to gyroscopically move through the pivot angle but small enough to contact the washer 72 to limit travel of the upper assembly 34 should the travel of the upper assembly attempt to exceed the desired pivot angle .

The lower sidewall 92 is preferably substantially smooth and of uniform diameter, whereas the upper sidewall 96 is split and preferably includes a plurality of angled sidewalls 98 and 100 on opposite sides of a throat 102. The sidewall 98 is preferably inwardly angled at a slope of about 30 degree to facilitate insertion of the washer 72 into the bore 88 and guide it through the throat 102 which preferably has a diameter slightly less than that of the washer. The sidewall 100 is preferably outwardly angled at a slope of about 45° to guide the washer 72 away from the throat to discourage accidental passage of the washer back through the throat 102. As will be appreciated, the split construction of the upper sidewall enables the throat to enlarge for passage of the washer 72 during installation and/or removal of the upper assembly 34 from the housing 52. That is, the washer 72 snaps into the housing 52 and the throat 102 limits upward travel of the upper assembly to maintain the head 14 adjacent the body 12. However, if desired as for the making of adjustments, the head may be removed by, for example, grasping the head and pulling it away from the body to urge the washer 72 back through the throat 102 and thereby release the head from the body.

Figure 6A:
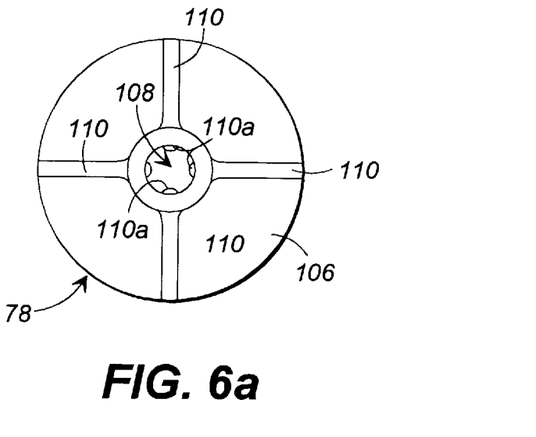
Figure 6B:
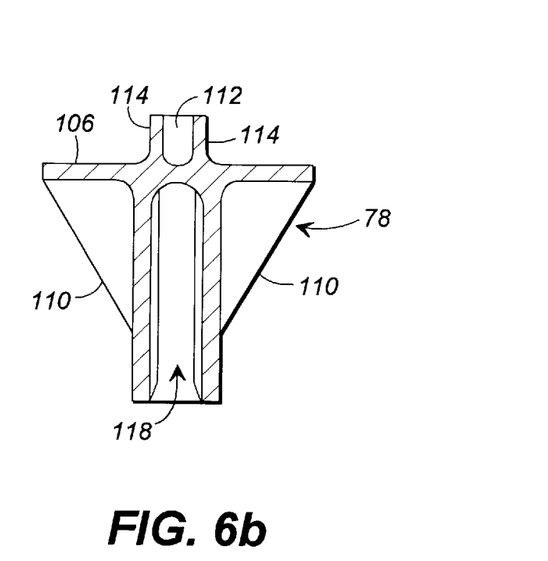
Figure 6C:
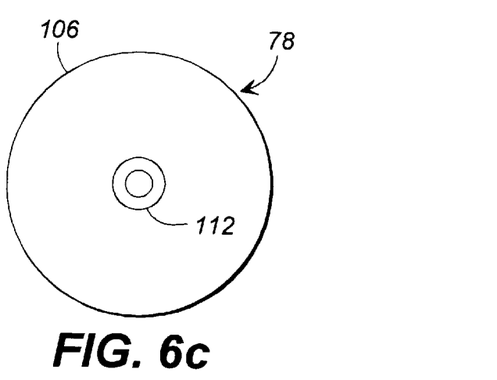

With reference to FIGS. 6a–6c, the adjusting head 78 is preferably provided by a one piece plastic member. In a preferred embodiment, the adjusting head 78 includes a flat circular base 106 having a blind bore 108 extending perpendicularly away from one side of the base 106 and strengthened by gussets 110 which surround the bore 108 and partially extend into the sidewall of the bore 110, as represented by gusset portions 110a. The gusset portions 110a being plastic, deform in response to rotational introduction of the end 76 of the bolt 70 and threadably receive the bolt. a shorter blind bore 112 extends perpendicularly away from the opposite side of the base.

The central axis of each bore 108 and 112 is preferably aligned with the center of the base. Sidewalls 114 of the bore 112 are extended through an aperture 116 provided through the head 14 of the replica and bent outwardly against the head 14 by application of pressure and heat to rivet the adjusting head 78 in position with the base 106 against the inner surface of the head 14 (FIG. 3a). The aperture 116 is preferably located through the central vertical axis of the head 14. Further securement of the adjusting head may be accomplished as by use of adhesives applied to the inner surface of the head 14 and the base 106.

Figure 7:
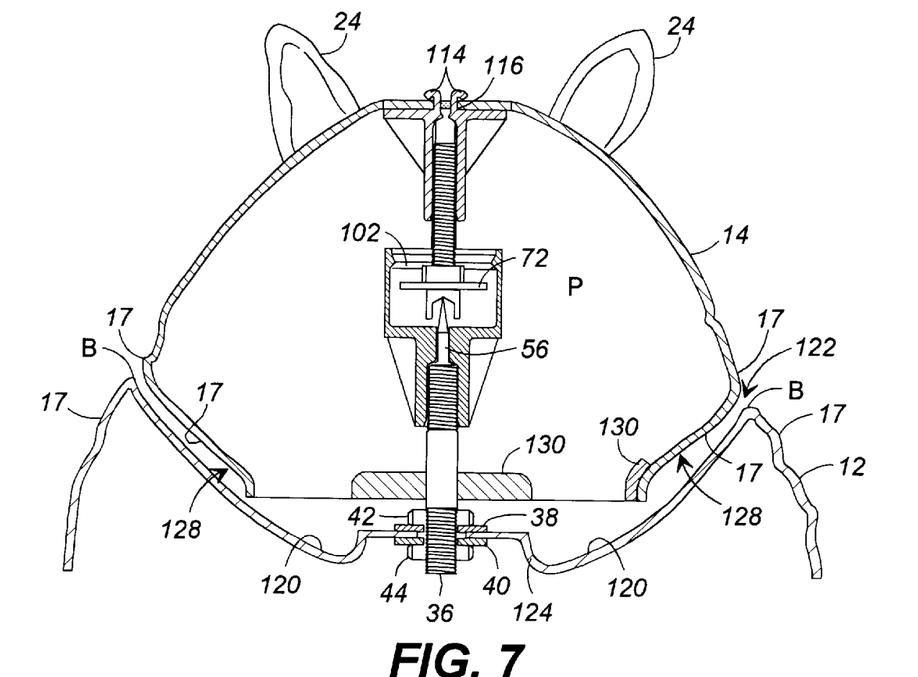
FIG. 7 is a cross-sectional view of a portion of an owl replica provided in accordance with the invention showing positioning of the pivot point relative to the center of gravity of the owl's head.
Figure 8:
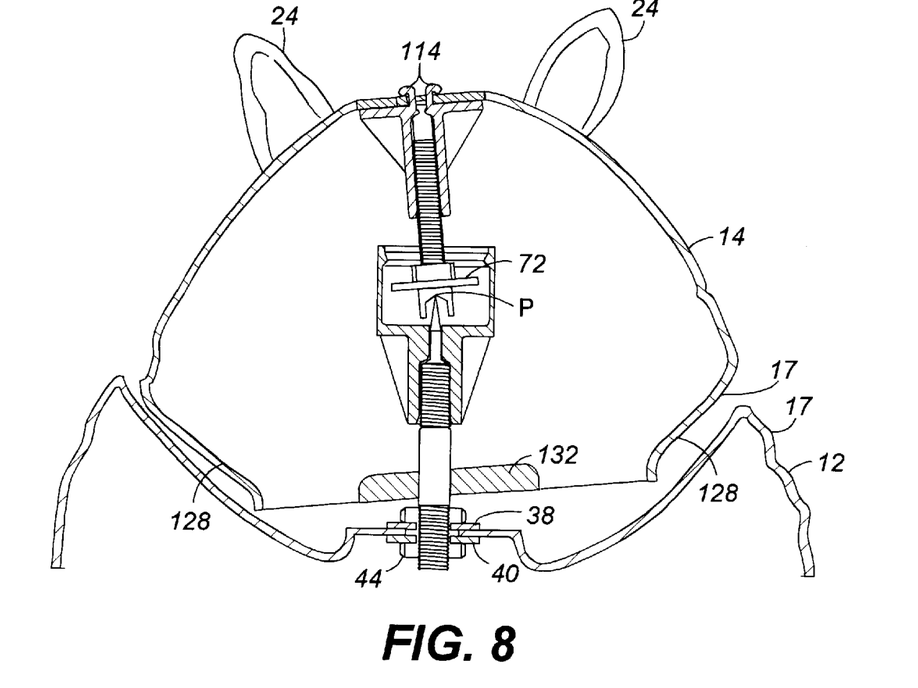
FIG. 8 is a cross-sectional view as in FIG. 7, with the head rocked to one side.

Turning now to FIGS. 7 and 8, it will be appreciated that it is desirable to position the head 14 and the body 12 relative to one another so as to not detract from the realism of the owl replica 10. In this regard, it is noted that the upper portion of the body 12 is provided by a concave upper surface 120 and an adjoining lower portion 122 of the head 14 is preferably configured to conform generally to the recess provided by the upper portion of the body 12.

The upper surface 120 is preferably continuous and includes a raised plateau 124 for mounting of the lower assembly 32. Mounting of the lower assembly 32 may be accomplished by passing the bolt 36 through an aperture 126 provided through the plateau 124 and securing the bolt in place using washers 38 and 40 and bolts 42 and 44. The height of the needle 56 above the plateau may be readily adjusted using the bolts 42 and 44. The lower assembly 34 may be installed on the head 14 as previously described and the upper and lower assemblies joined as by urging the washer 72 through the throat 102 such that the conical surface 64 of the head 71 rests on the point 60 of the needle 56.

As noted, the lower portion 122 of the head 14 is preferably configured to conform generally to the recess provided by the upper surface 120 of the body 12. In this regard, it is noted that the head 14 is hollow and includes sloped sidewalls 128 which correspond to the slope of the the upper concave portion 120 of the body 12 and are closely spaced a distance S from the surface 120 when the head 14 is installed on the body. Preferably, the distance S is from about 0.062 inch to about 0.187 inch, most preferably about 0.125 inch.

The sidewalls 128 are preferably configured such that when the head 14 is installed the sidewalls 128 begin adjacent the outer edge of the surface 120 (denoted Point B) and terminate short of the plateau 124 to provide access into the head 14 and sufficient clearance such that the sidewalls do not contact the bolt 36 during normal movement of the head through the pivot angle or other movement in response to wind movement as shown in FIG. 8. Thus, it will be appreciated that the head 14 is "countersunk" into the body 12 to enhance the realistic appearance of the replica and to avoid diminishment of this appearance during movement of the head 14.

As noted previously, the outer surfaces of the sidewalls are also preferably crafted to incorporate feather and other appearance features of a live owl such to compliment the realistic appearance of the replica. In this regard, it will be appreciated that movement of the head relative to the body results in a substantially constant clearance between the head and the body so that the feather and other contours of the head appear substantially continuous with the feather and other contours of the body to provide a realistic, substantially continuous surface appearance that imitates the appearance of a live owl moving its head.

To promote realistic movement of the head 14 and to render the head 14 susceptible to movement from even slight wind movement, the pivot point P defined by the juncture between the point of the needle and the conical surface of the allen head cap screw is preferably selected to coincide with a point slightly above the center of gravity of the head 14 so that the head 14 tends to return to a level position when the head is undisturbed as during the absence of wind and moves readily upon exposure to even slight wind. In a preferred embodiment, point P is selected to be from about 0.03 to about 0.25 inch (which corresponds to from about 0.75% to about 6% of the head height) above the center of gravity of the head, most preferably about 0.062 (which corresponds to 1.5% of head height) inch above the center of gravity.

It has been observed that positioning the pivot point below the center of gravity will typically render the head unstable characterized by a downward flopping of the head 14. If the pivot is at the center of gravity, the head will be level and easily displaced in any direction, but will not return to a level orientation when left undisturbed. If the pivot is too far above the center of gravity, the head 14 will typically be very stable and will rotate but will not easily displace in the presence of a light wind and thus will not exhibit much nodding or rocking movement.

Accordingly, a desired pivot position may be obtained by adjusting the position of the pivot point, as by adjustment of the bolt 70 into or out of the adjusting head 72 until the head appears to be at about the center of gravity of the head and thereafter adjusting the bolt 70 so that the pivot point P is just slightly above this point and the head exhibits lively action and returns to level when undisturbed. If desired, ballast such as weights 130 may be secured by crimping or by adhesive to the inner surface of the owl head, preferably on the lower periphery of the sidewalls 128 to provide desired adjustment to the center of gravity.

As will be appreciated, the invention provides a device having improved deterrent characteristics as compared to conventional devices such as one-piece plastic owls and inflatable owl replicas. As noted, owl replicas provided in accordance with the invention have head portions which are movable in imitation of the head movements of real owls. For example, the head of the replica may rotate in a circular manner about the body of the owl, thus imitating the unique ability of owls to rotate their heads. In addition, the invention enables further movement of the head such that at any given moment the head may be rotating and/or nodding and/or rocking and thus provide movement which imitates the head movement of a live owl to provide an improved deterrent effect on common garden pests which represent typical food for owls.

The foregoing description of certain embodiments of the present invention has been provided for purposes of illustration only, and it is understood that numerous modifications or alterations may be made without departing from the spirit and scope of the invention as defined in the following claims.

What is claimed is:

1. A replica of an owl for use in a garden for deterring pests, the replica comprising a first body portion corresponding generally in shape to the body of a live owl and a second body portion corresponding generally in shape to the head of a live owl, an unstable mount disposed between the first and second body parts, the second body portion being mounted by said mount adjacent an upper portion of the first body portion for movement relative to the first body portion to simulate movement of an owl's head, the second body portion being countersunk into the first body portion to enhance the realistic appearance of the replica and to avoid diminishment of this appearance during movement of the second body portion relative to the first body portion.

2. The replica of claim 1, wherein the first body portion has a longitudinal axis corresponding to the length of the first body, the first body being securable to a support in an upright position such that the longitudinal axis of the first body is substantially vertical, and the second body has a longitudinal axis corresponding to the height of the second body, with the longitudinal axis of the first and second bodies being in substantial vertical alignment and the second body being mounted for rotation in an axis of rotation about the longitudinal axis of the second body.

3. The replica of claim 1, wherein the second body is mounted for rotation through at least about 180 degrees.

4. The replica of claim 1, wherein the second body is mounted for rotation through at least about 360 degrees.

5. The replica of claim 1, wherein the second body rotates in response to movement of air adjacent to the second body.

6. The replica of claim 1, wherein said mount comprises a pivot mount providing pivotal movement about a pivot point disposed above the center of gravity of the second body portion by a distance of between about 0.75% and 6% of the height of the second body portion.

7. A device for deterring animal pests, the device comprising a body portion configured to resemble a body portion of a predator of such pests and a second body portion configured to resemble a head portion of the predator, the second body portion being countersunk into the first body portion, structure for movably mounting the head portion to the body portion such that the head portion is freely moveable in a rotational, back-and-forth, and side-to-side relationship relative to the body portion, the structure for movably mounting the head comprising an upper pivot assembly balanced onto a lower pivot assembly, the upper pivot assembly being rigidly connected to the head portion and the lower pivot assembly being rigidly connected to the body portion.

8. The device of claim 7, wherein the predator comprises owls.

9. The device of claim 7, wherein the upper pivot assembly comprises a conical surface extending from an inner surface of the head portion and the lower pivot assembly comprises a needle extending upwardly from the body portion, wherein the conical surface is positioned onto the needle.

10. A replica of an owl for use in a garden for deterring pests, the replica comprising:
   a head corresponding generally in shape to the head of a live owl and having contours on an outer surface thereof corresponding in shape and appearance to feathers of a live owl, said head being generally hollow and globe-shaped and having an aperture adjacent a lower portion of the head for access into the hollowness of the head;
   a body corresponding generally in shape to the body of a live owl and having contours on an outer surface thereof corresponding in shape and appearance to feathers of a live owl, said body having a generally concave upper surface;
   a retention system disposed between the head and the body for movably retaining the head closely adjacent the body, the head being mounted by said retention system adjacent the generally concave upper surface of the body for movement relative to the first body portion to simulate movement of an owl's head, wherein the upper surface of the body and the lower portion of the head are mutually configured so that movement of the head relative to the body results in a substantially constant clearance between the head and the body so that the contours of the head appear substantially continuous with the contours of the body to provide a realistic, substantially continuous surface appearance that imitates the appearance of a live owl moving its head.

11. The replica of claim 10, wherein the retention system comprises a low friction surface extending upwardly from a central portion of the upper portion of the body and a generally downwardly facing curved receiving surface extending downwardly from a central portion of the interior of the head toward the aperture, the juncture of the low friction surface and the receiving surface defining a pivot point positioned adjacent the center of gravity of the head.

12. The replica of claim 11, wherein the pivot point is slightly above the center of gravity of the head so that the head tends to return to a level position when the head is undisturbed as during the absence of wind and moves readily upon exposure to even slight wind.

13. The replica of claim 12, wherein the pivot point is from about 0.03 to about 0.25 inch above the center of gravity of the head.

14. The replica of claim 13, wherein the pivot point corresponds to a point above the center of gravity of the head a distance of between about 0.75% and 6% of the height of the head.

15. The replica of claim 10, wherein the retention system comprises an upper retention assembly supported by a lower retention assembly for movement of the upper retention assembly relative to the lower retention assembly;
   the lower retention assembly comprising a low friction surface rigidly positioned relative to the body and extending vertically upwardly from a central portion of the upper portion of the body and surrounded by a generally circular wall having a substantially rigid first portion having a first diameter adjacent the low friction surface and a second yieldable and smaller diameter section above the low friction surface; and
   the upper assembly comprising a generally downwardly facing curved receiving surface rigidly positioned relative to the head and extending downwardly from a central portion of the interior of the head toward the aperture and a flange positioned above the receiving surface, the flange having a diameter less than the first diameter and greater than the second diameter such that the flange may be urged through the second section of the lower assembly for passage into the first section of the lower assembly;
   wherein the low friction surface of the lower assembly is received by the receiving surface of the upper assembly and the flange is received within the circular wall adjacent the first diameter such that the upper retention assembly is movable relative to the lower retention assembly, the first section of the lower assembly providing a first flange contact surface for contacting portions of the flange to limit horizontal and/or side-to-side and/or front-to-back travel of the upper retention assembly and the second section of the lower assembly providing a second flange contact surface for contacting portions of the flange to limit vertical travel of the upper assembly.

16. The replica of claim 15, wherein the low friction surface comprises a needle.

17. The replica of claim 15, wherein the receiving surface comprises a conical surface.

18. A replica of an owl for use in a garden for deterring pests, the replica comprising:
   a head corresponding generally in shape to the head of a live owl and having contours on an outer surface thereof corresponding in shape and appearance to feathers of a live owl, said head being generally hollow and globe-shaped and having an aperture adjacent a lower portion of the head for access into the hollowness of the head;
   a body corresponding generally in shape to the body of a live owl and having contours on an outer surface thereof corresponding in shape and appearance to feathers of a live owl, said body having a generally concave upper surface,
   a retention system disposed between the head and the body for movably retaining the head closely adjacent the body, the head being mounted by said retention system adjacent the generally concave upper surface of the body for movement relative to the first body portion to simulate movement of an owl's head, wherein the upper surface of the body and the lower portion of the head are mutually configured so that movement of the head relative to the body results in a substantially constant clearance between the head and the body so that the contours of the head appear substantially continuous with the contours of the body to provide a realistic, substantially continuous surface appearance that imitates the appearance of a live owl moving its head, the retention system comprising:

an upper retention assembly supported by a lower retention assembly for movement of the upper retention assembly relative to the lower retention assembly;

the lower retention assembly comprising a low friction surface rigidly positioned relative to the body and extending vertically upwardly from a central portion of the upper portion of the body and surrounding by a generally circular wall having a substantially rigid first portion having a first diameter adjacent the low friction surface and a second yieldable and smaller diameter section above the low friction surface; and the upper assembly comprising a generally downwardly facing curved receiving surface rigidly positioned relative to the head and extending downwardly from a central portion of the interior of the head toward the aperture and a flange positioned above the receiving surface, the flange having a diameter less than the first diameter and greater than the second diameter such that the flange may be urged through the second section of the lower assembly for passage into the first section of the lower assembly;

wherein the low friction surface of the lower assembly is received by the receiving surface of the upper assembly and the flange is received within the circular wall adjacent the first diameter such that the upper retention assembly is movable relative to the lower retention assembly, the first section of the lower assembly providing a first flange contact surface for contacting portions of the flange to limit horizontal and/or side-to-side and/or front-to-back travel of the upper retention assembly and the second section of the lower assembly providing a second flange contact surface for contacting portions of the flange to limit vertical travel of the upper assembly.

19. The replica of claim 18, wherein the low friction surface comprises a needle.

20. The replica of claim 18, wherein the receiving surface comprises a conical surface.

21. The replica of claim 18, wherein the flange comprises a washer.

22. A device for deterring animal pests, the device comprising:

a body portion configured to resemble a body portion of a predator of such pests;

a second body portion configured to resemble a head portion of the predator, the second body portion being countersunk into the first body portion;

structure for movably mounting the head portion to the body portion such that the head portion is freely moveable in a rotational, back-and-forth, and side-to-side relationship relative to the body portion, the structure for movably mounting the head comprising an upper pivot assembly balanced onto a lower pivot assembly, the upper pivot assembly being rigidly connected to the head portion and the lower pivot assembly being rigidly connected to the body portion;

a first stop for limiting pivotal movement of the upper assembly; and a second stop for limiting vertical movement of the upper assembly to maintain the upper pivot assembly adjacent the lower pivot assembly.

* * * * *

UNITED STATES PATENT AND TRADEMARK OFFICE
CERTIFICATE OF CORRECTION

PATENT NO. : 5,901,491

DATED : May 11, 1999

INVENTOR(S) : Caldwell, E. Neal

It is certified that error appears in the above-identified patent and that said Letters Patent is hereby corrected as shown below:

Column 3, line 32, after "angle" please insert --$\propto$--.

Column 4, line 5, after "angle" please insert --$\propto$--.

Column 4, line 8, after "angle" please insert --$\propto$--.

Signed and Sealed this

Fourth Day of January, 2000

Attest:

Attesting Officer

*Acting Commissioner of Patents and Trademarks*